Figure 1:
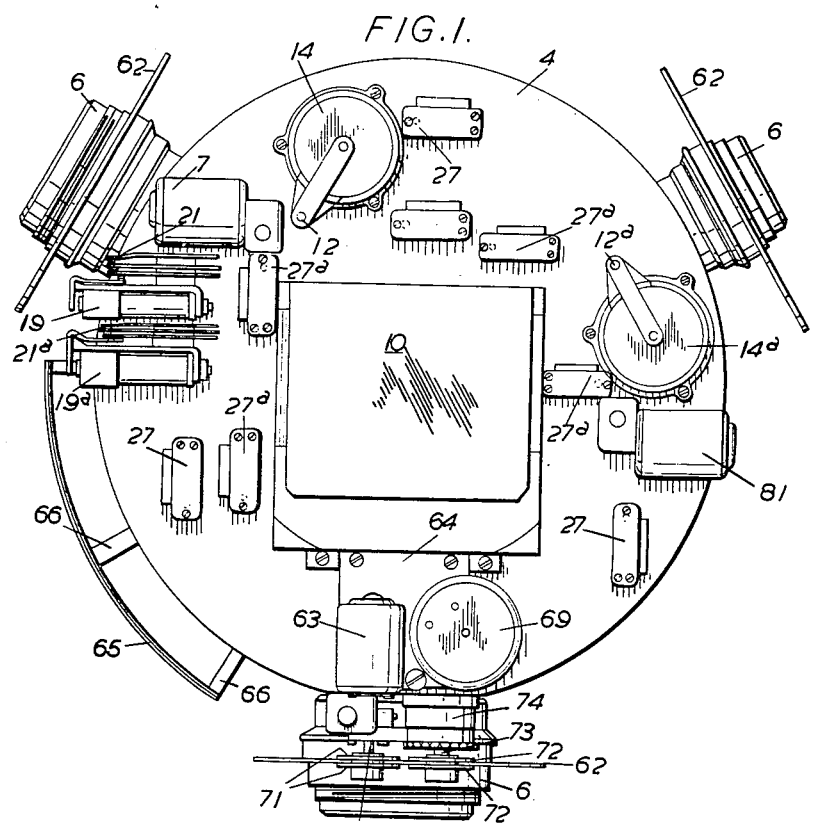

Sept. 13, 1955     G. E. MESSENGER ET AL     2,717,544
REPRODUCTION CAMERA

Filed April 25, 1951     8 Sheets-Sheet 1

Inventor
George E. Messenger
Dennis A. W. Batchelor
By
Attorney

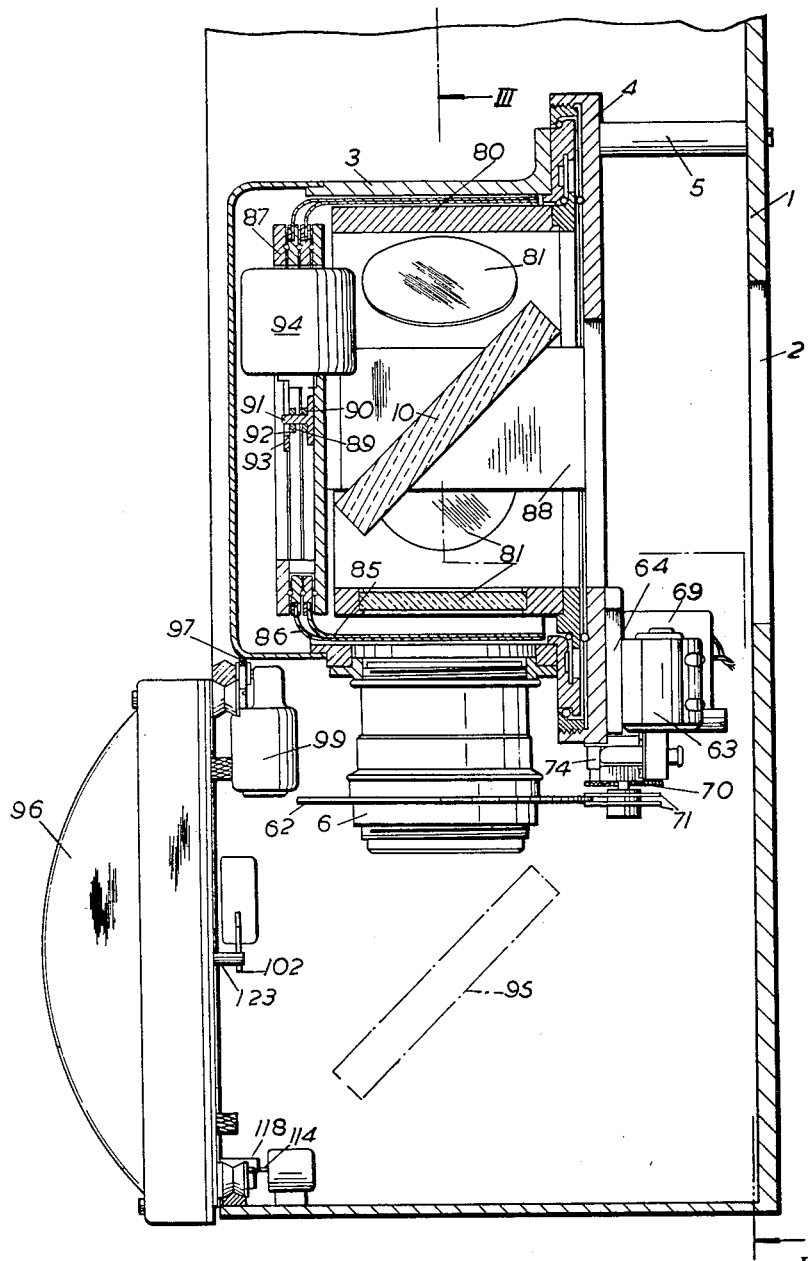

Sept. 13, 1955    G. E. MESSENGER ET AL    2,717,544
REPRODUCTION CAMERA

Filed April 25, 1951    8 Sheets-Sheet 3

FIG.3.

Inventors
George E. Messenger
Dennis A. W. Batchelor
By
Attorney

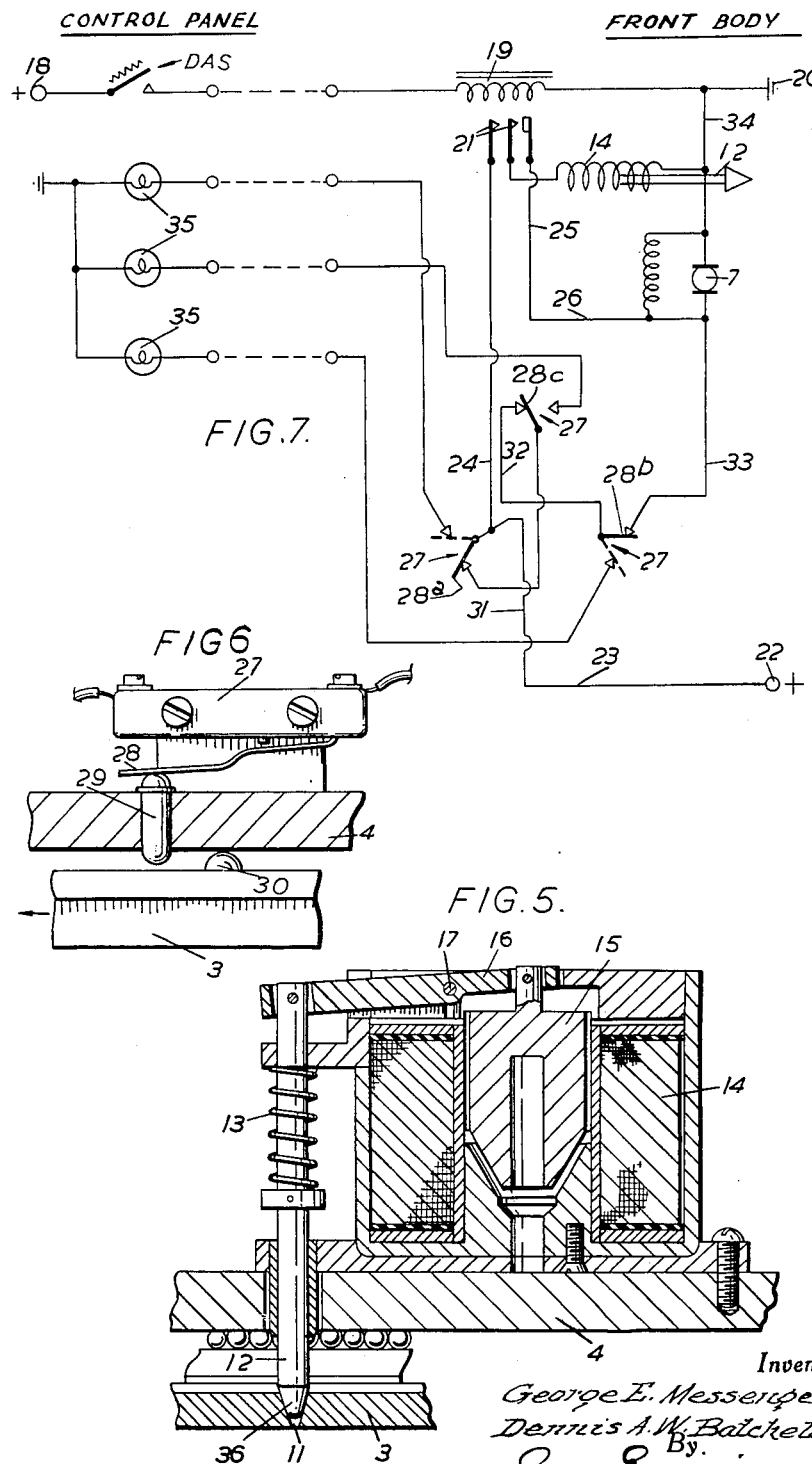

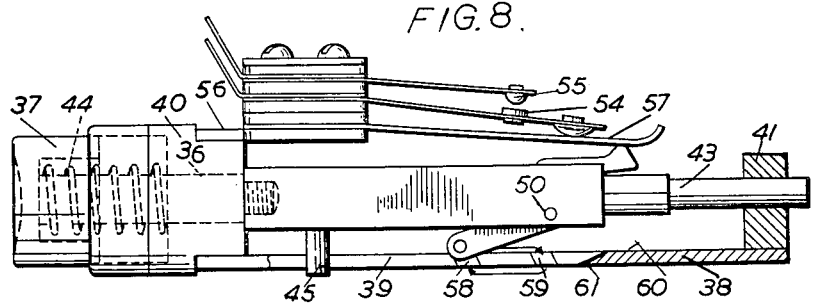
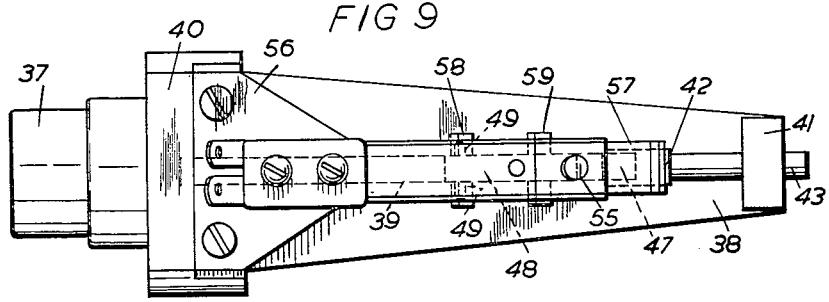
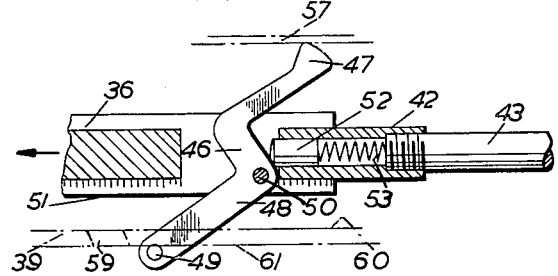

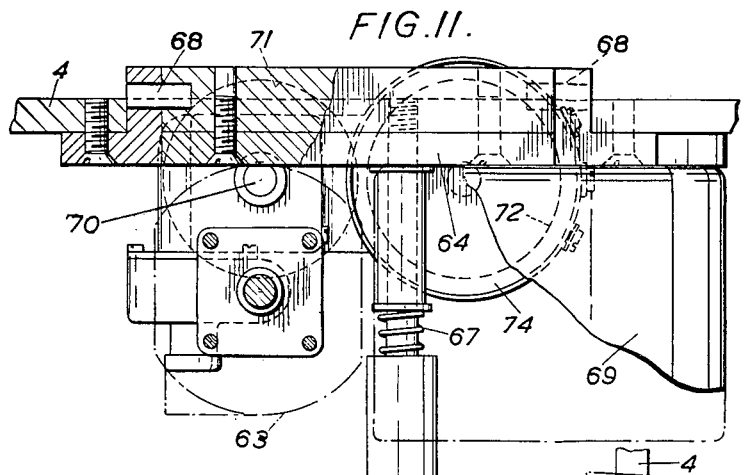
FIG.11.
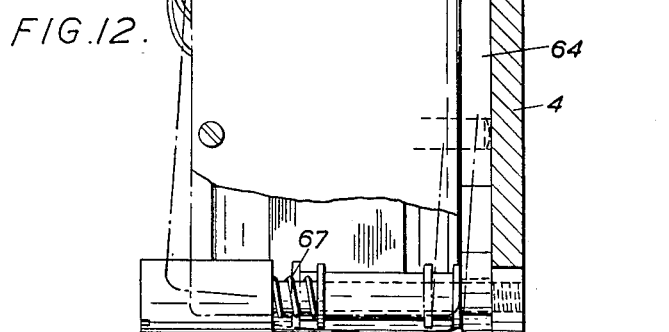
FIG.12.
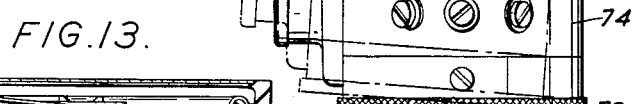
FIG.13.
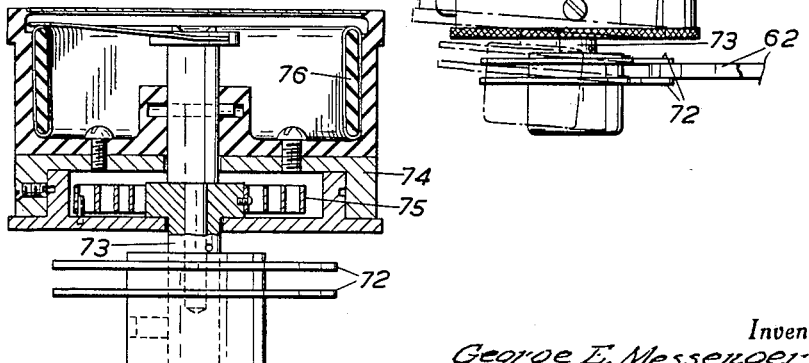

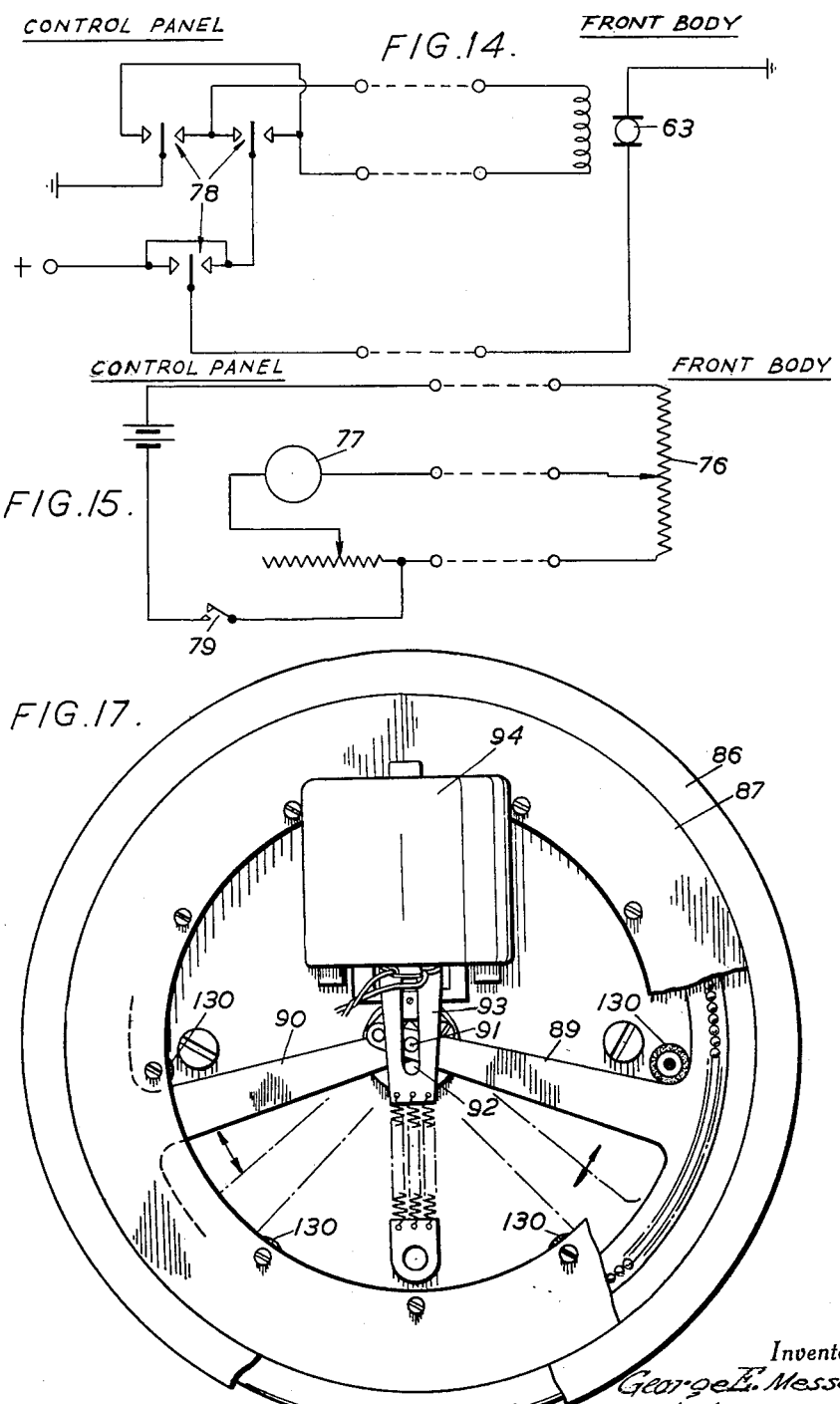

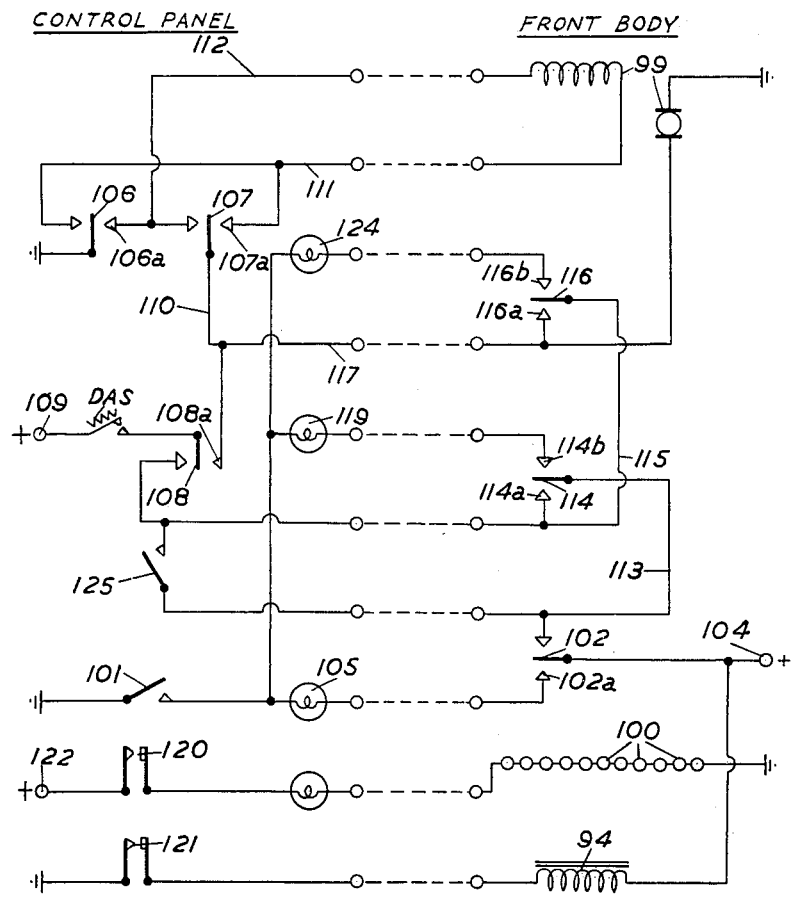

United States Patent Office 2,717,544
Patented Sept. 13, 1955

2,717,544

REPRODUCTION CAMERA

George Edward Messenger, New Barnet, and Dennis Arthur William Batchelor, London, England, assignors to Hunter-Penrose Limited, London, England, a British company Application April 25, 1951, Serial No. 222,766

Claims priority, application Great Britain April 27, 1950

8 Claims. (Cl. 95—45)

This invention relates to reproduction cameras and to apparatus for controlling parts of such cameras from position remote therefrom.

As is well understood in the art, reproduction cameras are known in which the optical systems of the cameras are capable of adjustment to permit the production of either a normal or a reversed image and a camera constructed according to the present invention may incorporate any suitable known optical system whereby normal or reversed images may be selectively produced.

In the operation of a reproducing camera it is usual manually to effect adjustment of the lenses, filters, and other selectively adjustable parts of the camera and this has heretofore entailed considerable movement about the camera by the operator thereof. It is a main object of the present invention to provide apparatus whereby selective adjustment of movable parts of a reproduction camera can be effected by the operator from a position or positions remote from these parts.

According to the invention there is provided for the remote control of a reproducing camera, apparatus comprising a mounting for a movable part of the camera, an electric motor to effect movement of the mounting between predetermined positions thereof, a locking device in circuit with the electric motor and movable relatively to the mounting to release the mounting for movement between said predetermined positions thereof and to locate and retain the mounting in a selected predetermined position, a limit switch to close said circuit, and a manually operable delayed action switch to open said circuit on application of digital pressure thereto and operable on release of digital pressure thereon to condition said circuit for closure by said limit switch.

One of the parts of the camera which requires selection according to the work to be done is the lens and in one aspect of the invention the mounting is rotatable about a horizontal axis and supports a plurality of lenses and holders therefor, the lenses and holders being equi-spaced around the mounting and having their optical axes radial with respect thereto, said mounting being movable selectively to locate a lens in optical alignment with the remainder of the optical system of the camera.

Further selective integers of the camera are filters for use in association with the lenses and to facilitate the selection of the filters a second mounting is supported for rotation about said horizontal axis for control independently from said first mentioned mounting, said second mounting supporting a plurality of filters for selective association with said lenses.

Figure 4:
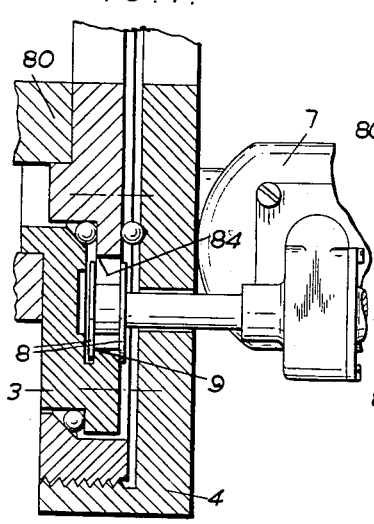
Figure 16:
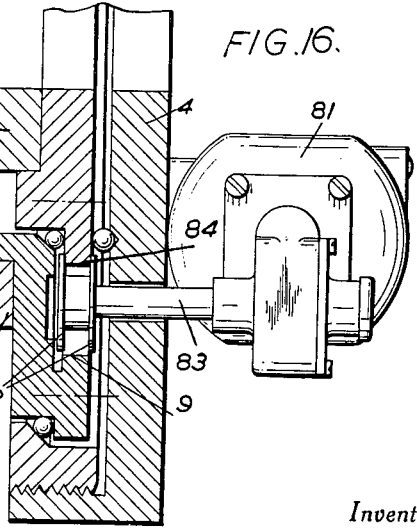

In order that the invention may be clearly understood an embodiment thereof will now be described, by way of example, with reference to the accompanying diagrammatic drawings, in which:

Fig. 1 is a front elevation of a part of a reproducing camera according to the invention, Fig. 2 is a sectional elevation of a lens carrier for a reproducing camera according to the invention, Fig. 3 is a section on line III—III, Fig. 2, Fig. 4 is a section, to an enlarged scale, and shows the manner in which the mounting for the lens holders is rotated by its associated electric motor, Fig. 5 is a section, to an enlarged scale, showing the locking device for the mounting for the lens holders, a like locking device being provided for a filter mounting, Fig. 6 illustrates one of the limit switches employed in the apparatus, such switches being employed with the rotatable mounting for the lens holders and with a similar mounting for filters, Fig. 7 is a circuit diagram illustrating the manner in which the mounting for the lens holders is controlled from a control panel, the filter mounting being controlled by a like circuit, Fig. 8 is a side elevation of the delay action switch employed to initiate action of the motors, Fig. 9 is a top plan of Fig. 8, Fig. 10 is a view, to an enlarged scale, of the switch trigger, Fig. 11 is a plan of the device for adjusting the iris diaphragm ring of a lens holder, Fig. 12 is a side view of Fig. 11 and shows the mechanism for transmitting to the control panel an indication of the extent of adjustment of the iris diaphragm ring, Fig. 13 is a section, to an enlarged scale, of a part of the mechanism, shown in Fig. 12, Fig. 14 is a circuit diagram illustrating the manner in which the iris diaphragm adjustment is effected, Fig. 15 is a diagram of the circuit for the voltmeter which gives an indication as to the extent to which a diaphragm is adjusted, Fig. 16 is a section, to an enlarged scale, showing the manner of driving the filter carrying drum, Fig. 17 is a view showing the toggle mechanism for the shutters, and Fig. 18 is a circuit for the flashing unit mechanism.

Referring to the drawings, the optical system for the camera is contained in a casing 1, Figs. 2 and 3, having an opening 2 in the front thereof, and being open at the back, through which light rays from the object to be photographically reproduced pass to an element, not shown, having a photographic emulsion. The optical system is contained in the casing and is of any known form suitable, on selection in known manner, for the production of normal or reversed images.

A plurality of lenses for inclusion in the optical system is supported on a mounting comprising a hollow drum 3 which is contained in the casing 1 and which is supported for rotation about a horizontal axis. The drum 3 runs on ball bearings and is supported for rotation by a circular support 4 which is secured by pillars 5, Fig. 2, to the casing 1. The lenses, each contained in a lens holder 6 in known manner, are equi-distantly spaced around the mounting 3 and by rotating the mounting any of the lenses may be selectively brought into alignment with the remainder of the optical system to form a part thereof.

The mounting 3 is rotatable by an electric motor 7, Figs. 1 and 4, which rotates a pair of spring flanges 8, Fig. 4, adapted frictionally to engage an annular lip 9 formed on the drum 3 and the front of the drum is open so that a mirror 10 or other reflecting surface can be located within the drum to direct rays of light from an object to be photographed on to the lens located in the optical system. The face of the drum 3 is provided with a plurality of sockets 11, Fig. 5, one for each lens, to be engaged by a locating pin 12 thus forming a locking device which is movable relatively to the drum to release the drum for movement between predetermined positions thereof and to locate and retain the drum in a selected position at which a selected lens is aligned with the remainder of the optical system. The locating pin 12 is urged towards the drum by a spring 13 but is arranged to be moved in the opposite direction by a solenoid 14 the armature 15 of which is connected to one end of a lever 16 pivoted at 17 and having its other end connected to the locating pin. The solenoid 14, as shown in Fig. 7, is in circuit with the electric motor 7 and control of the drum is effected from a control panel remote from the camera through the medium of a manually operated control switch indicated generically in Fig. 7 by the reference DAS and described in detail below with reference to Figs. 8 to 10.

Referring to Fig. 7, a source 18 of electric current is connected through the switch DAS and a relay 19 with earth at 20. The relay 19 has normally open contacts 21 which are closed during the short interval during which the relay is energised after digital pressure has been removed from the switch DAS and during this interval the solenoid 14 is energised from the source 18 and withdraws the pin 12 from the socket 11, Fig. 5, in the face of drum 3. Also during this interval electric current passes from a second source 22 along lines 23, 24 through contacts 21, and lines 25, 26 to the motor 7 which starts to rotate drum 3. The control switch DAS ensures that relay 19 remains energised until the pin 12 has been withdrawn from socket 11 and the drum 3 has been turned a distance such that the pin and socket are completely out of alignment when the solenoid is de-energised and the contacts 21 open thus breaking the motor circuit via lines 25, 26. By the time this occurs, however, the drum 3 has been turned sufficiently to reverse the action of one of three limit switches 27, one for each lens holder 6. The switch 27 which is so reversed is, of course, the one which while the drum is located in the position of register thereof is operative to interrupt the motor circuit as described below. Each limit switch comprises a switch actuating member 28, Fig. 6, for control by a plunger 29 slidable in the support 4 and acts normally to close the motor circuit from source 22. A stud or projection 30 extending from the face of the drum 3 is arranged to engage the plunger so as to move it and thus through member 28 operate the switch 27 to interrupt the motor circuit. As illustrated in Fig. 7, each of the movable switch contacts 28a, 28b, 28c is in the normal position thereof to which, as is customary with this kind of limit switch, it is spring urged. Thus, current from source 22 passes via lines 31, 32, 33 to the motor 7 and thence via line 34 to earth 20. Accordingly, the motor 7 continues to operate until a lens holder 6 is brought into alignment with the optical system when the movable contact of the limit switch 27 associated therewith is reversed by its actuating member 28, on engagement thereof by the projection 30, thereby breaking the motor circuit and stopping the motor and also causing one of the lamps 35 on the control panel to be lighted to give an indication as to which lens holder has been located in the optical system. It will be understood that the operator will actuate the switch DAS a sufficient number of times to bring the desired holder 6 into the optical system, the appropriate lamp 35 indicating when this result has been achieved. To facilitate the entry of the locating pin 12 into the sockets 11 and the accurate location of the lenses by the pin, the leading end 36, Fig. 5, of the pin is of tapered form and the sockets are of bell-mouthed tapered section to conform to the shape of the pin.

Referring to Figs. 8 to 10, the control switch DAS comprises a plunger 36 supported in a slotted holder for axial movement under digital pressure applied to a button 37 secured thereto. The holder includes a base plate 38 having a slot 39 formed therein, for a purpose described below, and a pair of blocks 40, 41 secured to or integral with the base plate 38 and disposed opposite each other beyond the ends of the slot 39. The end of the plunger opposite that to which the button 37 is secured is provided with a tubular portion 42, Fig. 10, movable therewith and threaded on to one end of a guide pin 43 slidable axially in the block 41. A spring 44, Fig. 8, tends to urge the plunger 36 to its starting position and to avoid angular movement of the plunger a stud 45, Fig. 8, extends therefrom and slides in the slot 39.

The plunger 36 is slidable axially in the block 40 and has a trigger pivotally mounted thereon for movement therewith. The trigger comprises a right-angled bell-crank one arm 46 of which has a trigger portion 47 extending therefrom in a direction opposed to that of the other arm 48 of the bell-crank, hereinafter referred to as a tail, said trigger portion being disposed substantially at right-angles to the arm 46 with which it is integral. The tail 48 has lateral abutments 49 extending from the opposite sides thereof to engage one side of the base 38 as will be hereinafter described.

The pivot 50 for the trigger is disposed adjacent the longitudinal face 51 of the plunger 36 which is nearest the base plate and a pin 52 housed in the tubular portion 42 of the plunger is urged by a contact closing spring 53 into engagement with the arm 46. The contact closing spring 53 thus tends to urge the tail 48 through the slot 39 in the base 38.

The plunger extends axially between the base plate 38 and a pair of normally open electrical contacts 54, 55 supported by a plate 56 secured to the block 40. Between the plunger and the contact 54 and also supported by the plate 56, is a resilient element 57 which extends lengthwise of the longitudinal axis of the plunger. The resilient element 57 is so constructed and arranged that it normally overlies the trigger portion 47 and overcomes the action of the contact closing spring 53 thereby urging the trigger to its inactive position so that the contacts 54, 55 remain open.

The slot 39 in the base plate 38 is for a part of its length of a width such that the tail 48 can pass therethrough but the abutments 49 thereon are prevented from passing through the slot. At predetermined positions 58, 59, Fig. 9, however, the slot is of a width such that the abutments 49 can pass through the slot.

When digital pressure is applied to the button 37, the plunger 36 is moved forward axially against the action of the spring 44. During this movement of the plunger the abutments 49 of the trigger ride over the side 60, Fig. 8, of the base plate and the resilient element 57 retains the trigger portion in its inactive position as shown in Fig. 8. At the end of the forward movement of the plunger the trigger portion is disengaged from the resilient element 57 and the contact closing spring 53 then moves the trigger portion 47 to its active position, as shown in Fig. 10, the tail 48 and the abutments 49 thereon being moved through the widened portion 59 of the slot 39 in the base. The contacts are not closed at this time, however, as the trigger is out of range therewith and this condition appertains until digital pressure is released from the plunger.

On release of the digital pressure the plunger is returned by its spring 44 to starting position and the tail 48 of the trigger passes along the slot 39 in the base. When the trigger, which is now in its active position, is again engaged by the resilient element 57 the abutments 49 on the tail 48 are pressed against the side 61 of the base plate thus preventing the resilient element 57 from overcoming the contact closing spring 53. Accordingly, the trigger remains active during the return movement of the plunger and the resilient element 57, by reason of pressure exerted by the trigger 47 moves the contact 54 into engagement with the contact 55 thereby causing the relay 19 to be energized to effect operation of solenoid 14 and to condition line 25, 26 for closing by a limit switch 27 as described above.

At the end of the return movement of the plunger the abutments 49 on the trigger tail 48 are moved into the path of the wider portion 58 of the slot 39 and the resilient element 57 is then effective to overcome the contact closing spring 53 so that the tail and its abutments are moved through the widened slot portion 58 and the trigger is restored to its inactive position. As the resilient element restores the trigger the contacts 54, 55, and 21 are again restored to their normally open condition.

The lens holders 6 are, as stated above, constructed in known manner and each is provided with an iris diaphragm ring 62, Figs. 1, 2, 3 and 12, by which the diaphragm aperture can be adjusted. In accordance with the present invention the adjustment of the diaphragm ring is effected under control from a remote position after the selected lens has been located in alignment with the remainder of the optical system of the camera. To this end a reversible motor 63 is carried by a frame 64, Figs. 11 and 12, pivotally mounted on the support 4, Fig. 1, and is controlled by a three-way switch 78, Fig. 14, whereby the motor is, at the will of the operator, caused to stop, run forward, or run in reverse.

The arrangement of the apparatus is such that the iris diaphragm is always fully open when a lens holder is brought into alignment with the optical system and adjustment of the diaphragm is effected, as described below, after location of the lens in the optical system. To ensure that the diaphragm is open when it is brought into alignment with the optical system, as a lens holder is moved out of alignment with said system, the iris diaphragm ring 62 frictionally engages a member 65, Figs. 1 and 3, secured to distance pieces 66 carried by the mounting 4 and as it is moved over the member 65 the ring 62 is turned until the diaphragm is moved to its fully open position.

The frame 64, Figs. 11 and 12, is urged by a spring 67 towards the mounting 4 and is withdrawn from this position about its pivots 68 by a solenoid 69 which is energised through a trip or limit switch, not shown but similar to limit switch 27, on the support 4 and a projection, not shown but similar to projection 30, on the drum 3. When the solenoid 69 is operated its armature engages the mounting 4 and by rocking the frame 64 about its pivot holds the motor 63 and its associated mechanism described below out of the path of the ring 62 as its holder is moved into alignment with the optical system and a second trip or limit switch also not shown but operated by the same said projection last mentioned de-energises the solenoid 69 when the holder is properly located by the pin 12 so that the spring 67 returns the frame 64 to its active position.

The motor 63 includes a worm drive, not shown, adapted to rotate a spindle 70 to which is secured a pair of spring plate discs 71, Fig. 1, which grip the opposite sides of the ring 62 of a lens located in the optical system as above described. Thus when the motor 63 rotates the spindle 70 the ring 62 is turned by the discs 71 and when it has been turned to the desired extent the operator stops the motor 63.

As the diaphragm ring 62 is being adjusted from a position remote from the front of the camera it is desired that means be provided to afford the operator a visual indication of the extent of the adjustment effected and for this purpose further spring plate discs 72 are also arranged frictionally to engage the iris diaphragm ring 62. The discs 72 are secured to a spindle 73 rotatable in bearings in a housing 74 mounted on the frame 64 and the spindle 73 is urged angularly to a zero position by a spring 75, Fig. 13. When the iris diaphragm ring 62 is rotated by the discs 71 the discs 72 are rotated by the diaphragm ring and turn the spindle 73 against the action of its spring 75. The angular movement of the spindle 73 is employed to adjust a variable resistance 76, Figs. 13 and 15, included in the circuit of a voltmeter 77 disposed on the control panel and the fluctuations of the needle of the voltmeter afford the operator the desired visual indication of the extent to which the aperture in the diaphragm is adjusted. A switch 79, Fig. 15, is provided whereby the voltmeter circuit may be manually opened when the apparatus is not in use.

Referring to Figs. 2 and 3 there is provided a second mounting, comprising a hollow drum 80, with an open front face, and this drum supports a plurality of filters 80a, for example colour filters, for selective association with the lenses. The second drum 80 is disposed within the first drum 3 and is rotatable about the axis of rotation thereof. The second drum 80 is operable independently of the first drum 3 by an electric motor 81 by means of spring discs 82, Fig. 16, on the motor spindle 83, the discs gripping an annular lip 84 on the drum 80 and has a locking device similar to that described above for the first drum 3 as shown in Fig. 5 but the locating pin of which co-operates with sockets 11 in the face of the drum 80. The motor circuit is closed by a limit switch as shown in Fig. 6 but in which the stud 30 is on the drum 80, and a manually operable control switch, Figs. 8 to 10, opens the circuit and conditions it for closure as above described, the only difference from the circuit shown in Fig. 7 being that there are five limit switches 27a, Fig. 1, one for each filter, instead of the three shown in Fig. 7. There are, of course, lamps to indicate which of the filters is disposed in alignment with the optical system, a solenoid 14a controlling a locating pin 12a, a relay 19a, and contacts 21a. Thus when a selected lens has been located in position a filter may be selected and aligned therewith, the two operations being independently effected from a position remote from the front of the camera.

The shutters for the camera comprise two concentric hollow drums 85, 86, Fig. 2, which are also concentric with the axis of rotation of the two drums 3 and 80 and which are disposed for movement between the planes of a lens and a filter located in alignment with the remainder of the optical system of the camera as above described. The drums 85, 86 are rotatable in ball bearings in a mounting 87 supported by brackets 88 fixed to the mounting 4. The shutters are supported by a toggle mechanism comprising arms 89, 90, Fig. 17, integral with the shutter, and a pivot 91 common to the arms and slidable in a slot 92 in the armature 93 of a solenoid 94 energised by the actuation of a switch, not shown, on the aforesaid control panel. Resilient buffers 130 determine the extent of swinging movement of the shutters by engagement with the arms 89, 90.

As will be understood in the art, it is sometimes desired, in order to overcome the inertia of the emulsion, to effect a partial exposure prior to the main exposure. Accordingly means are provided whereby this may be effected under control from a remote point.

The mirrors or other reflecting surfaces of the optical system of which one is indicated at 95, Fig. 2, are disposed in the base of the casing 1 and a flashing unit is provided in the casing. The flashing unit comprises a lamphouse 96, Figs. 2 and 3, supported by conveyor chains 97 and sprockets 98 driven by an electric motor 99 so that the lamphouse can be traversed by the chains across the casing. If the image being recorded is a normal image the lamphouse is moved by the motor 99 to register with the mirror or reflecting surface which directs the rays on to the emulsion or if the image is a reversed image the lamphouse is moved to a second position to be aligned with the mirror or reflecting surface which directs the rays for the reversed image on to the emulsion. The motor 99 for the conveyor 97 is energised by a switch on the control panel and flash lamps 100, Fig. 18, in the lamphouse 96 are connected in circuit with the solenoid 94 operating the shutters 85, 86 so that the lamps 100 are caused to flash on opening of the shutters at the will of the operator.

Fig. 18 illustrates diagrammatically a circuit for controlling movement of the lamphouse and the flashing of the lamps therein.

The circuit includes a switch 101 which is closed before the lamphouse is moved and remains closed until it is manually opened when the apparatus is not required to be operated. Let it be assumed that the lamphouse is at the left of Fig. 3 so that a limit switch 102 is engaged by a contact 103 on the lamphouse. On closing the switch 101 current flows from source 104 via contact 102a and lights a lamp 105 on the control panel to indicate the position of the lamphouse. A three-way switch, not shown, is then operated so that switch arms 106, 107 and 108 engage contacts 106a, 107a and 108a respectively.

On operation of a control switch DAS as above described current from source 109 flows along line 110, contact 107a, line 111, motor 99, line 112, contact 106a thus energising the motor 99 and starting the forward movement of the lamphouse. This movement of the lamphouse causes the action of the limit switch 102 to be reversed so that contact 102b is engaged and current from source 104 flows via contact 102b, line 113, contact 114a, line 115, contact 116a, line 117, line 110, contact 107a, line 111, motor 99, line 112, contact 106a so that the motor continues to move the lamphouse until a contact 118 on the lamphouse operates a limit switch 114 thus breaking the motor circuit at contact 114a and putting an indicator lamp 119 in circuit via contact 114b.

When the lamphouse is in this position, as indicated in Fig. 3, the lamps 100 may be flashed by a switch, not shown, which simultaneoulsy closes contacts 120, 121 thereby simultaneously permitting current from source 122 to be applied to the lamps 100 and the solenoid 94 for the shutters.

Should it be desired thereafter to cause the lamphouse to be moved to its other extreme position, at the left as viewed in Fig. 3, the control switch DAS is again operated so that current passes from source 109 via contact 108a, line 110, contact 107a, line 111, motor 99, line 112 until a further abutment 123 on the lamphouse engages a limit switch 116 thus opening contact 116a and closing 116b thereby opening the motor circuit from source 104 and putting in circuit an indicator lamp 124.

It will be readily understood that the lamphouse will be moved in the reverse direction by reversing the action of the switch arms 106, 107 and 108.

Should it be desired to move the lamphouse from one of its extreme positions to the other without interruption this can be effected by closing a manually operable switch 125 before actuating the delayed action switch DAS.

It is sometimes desired that light passing through a lens passes through a stop comprising an aperture of predetermined size and shape, for example of square shape. To permit this function there may be provided a band, not shown, containing a plurality of apertures of different shapes and sizes the band being passed through slots formed in the lens barrels in a manner such that on lengthwise movement of the band the apertures cross the optical axis of a lens. The band may be provided with perforations adjacent one or both of its longitudinal edges, in the manner of a cinematograph film, for co-operation with a feed sprocket or the like. The sprocket is driven by an independent electric motor energised by a switch from the control panel so that the apertures in the band can be selectively positioned with respect to a lens and means may be provided to afford a visual indication of the aperture selected for alignment with a lens.

It will be understood, that if desired, in addition to the central control effected by actuation of control switches DAS on the control panel, other control switches DAS may be disposed about the camera at suitable positions, and connected in parallel with those on the control panel, to duplicate the various controls described herein.

We claim:

1. In a phohographic reproducing camera having an optical system including alternative optical elements for selective register with the remainder of the optical system, apparatus comprising a support, a hollow mounting supported by said suppor for angular movement about a horizontal axis, a plurality of alternative optical elements supported by and equi-spaced around said mounting for movement therewith into and out of said position of register, an electric motor coupled to the mounting to effect angular movement thereof, normally closed interrupter switches to connect said motor with a source of electrical potential, a switch operating element carried by said mounting to retain an interrupter switch in the open condition thereof when the mounting is in a position of register thereof, a locking device carried by and movable relative to said support to co-operate with and locate the mounting in positions of register thereof, resilient means to urge the locking device into cooperation with the mounting, a normally inactive solenoid connected with the locking device to disengage the device from the mounting, and a shunt circuit to connect said solenoid and motor with said source of potential and including a manually operable control switch operable on cessation of digital pressure applied thereto to effect temporary closing of the shunt circuit to release the locking device and effect initial energisation of the motor thereby to commence movement of the mounting to the next position of register thereof.

2. Apparatus according to claim 1, wherein the control switch comprises a plunger supported in a slotted holder for axial movement under digital pressure against the action of a spring, a pair of normally open contacts mounted on said holder, a trigger pivotally mounted on the plunger for movement therewith, a contact closing spring tending to urge the trigger to active position for effecting closing of the contacts, a resilient element tending to urge the trigger to inactive position, a tail on said trigger adapted to pass through the slot in the holder, and an abutment extending laterally from said tail, whereby on axial movement of the plunger due to digital pressure exerted thereon the resilient element retains the trigger in its inactive position and the abutment rides over one side of the holder to a predetermined position at which the trigger is disengaged by the resilient element and is urged by the contact closing spring to active position in which the tail is positioned for passage through the slot in the holder and on release of digital pressure the plunger is restored by its spring, the trigger engaging the resilient element and moving it to effect closing of said contacts while the abutment is engaged by the other side of the holder to retain the trigger in active position until the plunger is fully restored when the abutment is disengaged from said other side of the holder and the resilient element restores the trigger to its inactive position and permits opening of the contacts.

3. Apparatus according to claim 1 including an electrically actuated indicator device for each said alternative optical element carried by the mounting and connected in a normally open circuit closed by opening an interrupter switch appropriated thereto.

4. In a photographic reproducing camera having an optical system including alternative lenses for selective register with the remainder of the optical system, apparatus comprising a support, a hollow mounting supported by said support for angular movement about a horizontal axis, a plurality of lens holders supported by and equi-spaced around said mounting for movement therewith into and out said position of register, a rotatably adjustable iris diaphragm ring fitted to each lens holder, an electric motor coupled to the mounting to effect angular movement thereof, normally closed interrupter switches to connect said motor with a source of electric potential, a switch operating element carried by said mounting to retain an interrupter switch in the open condition thereof when the mounting is in a position of register thereof, a locking device carried by and movable relative to said support to co-operate with and locate the mounting in positions of register thereof, resilient means to urge the locking device into co-operation with the mounting, a normally inactive solenoid connected with the locking device to disengage the device from the mounting, a shunt circuit to connect said solenoid and motor with said source of potential and including a manually operable control switch operable on cessation of digital pressure applied thereto to effect temporary closing of the shunt circuit to release the locking device and effect initial energisation of the motor thereby to commence movement of the mounting to the next position of register thereof, and a diaphragm opening member carried by said support frictionally to engage said iris diaphragm ring during movement of its lens holder from the position of register thereof thereby to adjust the position of the ring to the fully open position thereof prior to the holder being again moved into its position of register.

5. Apparatus according to claim 4, wherein the control switch comprises a plunger supported in a slotted holder for axial movement under digital pressure against the action of a spring, a pair of normally open contacts mounted on said holder, a trigger pivotally mounted on the plunger for movement therewith, a contact closing spring tending to urge the trigger to active position for effecting closing of the contacts, a resilient element tending to urge the trigger to inactive position, a tail on said trigger adapted to pass through the slot in the holder, and an abutment extending laterally from said tail, whereby on axial movement of the plunger due to digital pressure exerted thereon the resilient element retains the trigger in its inactive position and the abutment rides over one side of the holder to a predetermined position at which the trigger is disengaged by the resilient element and is urged by the contact closing spring to active position in which the tail is positioned for passage through the slot in the holder and on release of digital pressure the plunger is restored by its spring, the trigger engaging the resilient element and moving it to effect closing of said contacts while the abutment is engaged by the other side of the holder to retain the trigger in active position until the plunger is fully restored when the abutment is disengaged from said other side of the holder and the resilient element restores the trigger to its inactive position and permits opening of the contacts.

6. In a photographic reproducing camera having an optical system and including alternative optical elements for selective register with the remainder of the optical system, apparatus comprising a support, a hollow mounting supported by said support for angular movement in one direction about a horizontal axis, a plurality of alternative optical elements supported by and equi-spaced around said mounting for movement therewith successively into and out of said position of register, a remotely controlled electric motor coupled to the mounting to effect angular movement thereof, an electrically displaceable locking device carried by and movable relative to said support to co-operate with and locate the mounting in positions of register thereof, normally closed interrupter switches on said support to connect the motor with a source of electric potential, a switch operating element carried by the mounting to retain an interrupter switch in the open condition thereof when the mounting is in a position of register thereof, and a shunt circuit including said motor and locking device and a manually operable control switch to release said locking device and temporarily to close the motor circuit to control movement of the mounting until an opened interrupter switch is closed on movement of said operating element out of co-operation therewith.

7. Apparatus according to claim 6, wherein the control switch comprises a plunger supported in a slotted holder for axial movement under digital pressure against the action of a spring, a pair of normally open contacts mounted on said holder, a trigger pivotally mounted on the plunger for movement therewith, a contact closing spring tending to urge the trigger to active position for effecting closing of the contacts, a resilient element tending to urge the trigger to inactive position, a tail on said trigger adapted to pass through the slot in the holder, and an abutment extending laterally from said tail, whereby on axial movement of the plunger due to digital pressure exerted thereon the resilient element retains the trigger in its inactive position and the abutment rides over one side of the holder to a predetermined position at which the trigger is disengaged by the resilient element and is urged by the contact closing spring to active position in which the tail is positioned for passage through the slot in the holder and on release of digital pressure the plunger is restored by its spring, the trigger engaging the resilient element and moving it to effect closing of said contacts while the abutment is engaged by the other side of the holder to retain the trigger in active position until the plunger is fully restored when the abutment is disengaged from said other side of the holder and the resilient element restores the trigger to its inactive position and permits opening of the contacts.

8. Apparatus according to claim 6, including an electrically actuated indicator device for each said alternative optical element carried by the mounting and connected in a normally open circuit closed by opening an interrupter switch appropriated thereto.

References Cited in the file of this patent

UNITED STATES PATENTS

| | | |
|---|---|---|
| 1,051,591 | Huebner | Jan. 28, 1913 |
| 2,000,090 | Mitchell | May 7, 1935 |
| 2,105,475 | Draeger | Jan. 18, 1938 |
| 2,135,507 | Hansch et al. | Nov. 8, 1938 |
| 2,230,251 | Jochum | Feb. 4, 1941 |
| 2,307,479 | Annick | Jan. 5, 1943 |
| 2,393,407 | Peterson | Jan. 22, 1946 |
| 2,482,571 | Arnold | Sept. 20, 1949 |
| 2,572,729 | Jackson et al. | Oct. 23, 1951 |

FOREIGN PATENTS

| | | |
|---|---|---|
| 531,524 | France | Oct. 26, 1921 |